United States Patent
Hegde et al.

(10) Patent No.: US 8,953,566 B2
(45) Date of Patent: Feb. 10, 2015

(54) PROVIDING A CELLULAR NETWORK WITH CONNECTIVITY TO A DIFFERENT NETWORK

(75) Inventors: Parameshwar Hegde, Billerica, MA (US); Fabio M. Chiussi, Long Branch, NJ (US)

(73) Assignee: Airvana LP, Chelmsford, MA (US)

( * ) Notice: Subject to any disclaimer, the term of this patent is extended or adjusted under 35 U.S.C. 154(b) by 789 days.

(21) Appl. No.: 12/345,472

(22) Filed: Dec. 29, 2008

(65) Prior Publication Data

US 2010/0165957 A1 Jul. 1, 2010

(51) Int. Cl.
| | |
|---|---|
| *H04W 4/00* | (2009.01) |
| *H04J 3/16* | (2006.01) |
| *H04J 3/22* | (2006.01) |
| *H04W 88/10* | (2009.01) |
| *H04W 76/02* | (2009.01) |

(52) U.S. Cl.
CPC ............ *H04W 88/10* (2013.01); *H04W 76/022* (2013.01)
USPC ............ 370/338; 370/328; 370/329; 370/466

(58) Field of Classification Search
None
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,664,081 B2 * | 2/2010 | Luoma et al. .................. | 370/338 |
| 7,764,981 B2 * | 7/2010 | Kalofonos et al. ............ | 455/574 |
| 8,520,659 B2 | 8/2013 | Humblet | |
| 2002/0196749 A1 | 12/2002 | Eyuboglu et al. | |
| 2003/0100311 A1 | 5/2003 | Chung et al. | |
| 2005/0185671 A1* | 8/2005 | Hansen et al. ................. | 370/466 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0025181 A1* | 2/2006 | Kalofonos et al. ............ | 455/574 |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |

(Continued)

OTHER PUBLICATIONS

3rd Generation Partnership Project "3GPP2", "cdma2000 High Rate Packet Data Air Interface Specification", C.S0024, version 4.0, Oct. 25, 2002 (548 pages).

(Continued)

*Primary Examiner* — Faruk Hamza
*Assistant Examiner* — Diane Lo
(74) *Attorney, Agent, or Firm* — Fish & Richardson P.C.

(57) ABSTRACT

Among other things, a system for use in wireless communication includes a first device communicating via a first protocol in a first network, a cellular device communicating via a second protocol in a cellular network, the second protocol being incompatible with the first protocol, and an access point in the cellular network, the access point being accessible by the cellular device and being configured to enable communication between the first device and the cellular device.

33 Claims, 7 Drawing Sheets

(56) References Cited

U.S. PATENT DOCUMENTS

| | | |
|---|---|---|
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076393 A1* | 3/2008 | Khetawat et al. ............ 455/411 |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2009/0131049 A1* | 5/2009 | Osborn ..................... 455/435.1 |
| 2009/0156213 A1* | 6/2009 | Spinelli et al. ............... 455/436 |
| 2010/0128709 A1* | 5/2010 | Liu et al. ..................... 370/338 |
| 2010/0130162 A1* | 5/2010 | Yang ............................ 455/406 |
| 2010/0165957 A1 | 7/2010 | Hegde et al. |

OTHER PUBLICATIONS

3rd Generation Partnership Project "3GPP2", "cdma2000 High Rate Packet Data Air Interface Specification", C.S0024-A, version 1.0, Mar. 2004 (1083 pages).

3rd Generation Partnership Project "3GPP2", "cdma2000 High Rate Data Air Interface Specification", C.S0024-A, version 2.0, Jul. 2005 (1227 pages).

3rd Generation Partnership Project "3GPP2", "cdma2000 High Rate Data Air Interface Specification", C.S0024-B, version 1.0, Apr. 2006 (1623 pages).

3rd Generation Partnership Project "3GPP2", "cdma2000 High Rate Data Air Interface Specification", C.S0024-B, version 2.0, Mar. 2007 (1627 pages).

Provisional application with appendix of U.S. Appl. No. 61/117,005, filed Nov. 21, 2008.

3rd Generation Partnership Project 2 "3GPP2", "Introduction to cdma2000 Standards for Spread Spectrum Systems", 3Gpp2 C.S0001-D, Version 2.0, Sep. 6, 2005, Release D (16 pages).

3rd Generation Partnership Project 2 "3GPP2", "Physical Layer Standard for cdma2000 Spread Spectrum Systems", 3GPP2 C.S0002-D, Version 2.0, Sep. 6, 2005, Revision D (538 pages).

3rd Generation Partnership Project 2 "3GPP2", "Medium Access Control (MAC) Standard for cdma2000 Spread Spectrum Systems", 3GPP2 C.S0003-D, Version 2.0, Sep. 2005, Release D (255 pages).

3rd Generation Partnership Project 2 "3GPP2", "Signaling Link Access Control (LAC) Standard for cdma2000 Spread Spectrum Systems", Release D, 3GPP2 C.S0004-D, Version 2.0, Sep. 2005, Revision D. v2.0, (264 pages).

3rd Generation Partnership Project 2 "3GPP2", "Upper Layer (Layer 3) Signaling Standard for cdma2000 Spread Spectrum Systems", Release D, 3GPP2 C.S0005-D, Version 2.0, Sep. 2005, Release D (2367 pages).

3rd Generation Partnership Project 2 "3GPP2", "Analog Signaling Standard for cdma2000 Spread Spectrum Systems", 3GPP2 C.S0006-D, Version 2.0, Sep. 2005, Release D (95 pages).

http://www.dlna.org, "The Digital Revolution is Here", retrieved from Internet on Aug. 25, 2014 (1 page).

http://upnp.org, "Standardized DCPs & Certification", retrieved from Internet on Aug. 25, 2014 (1 page).

* cited by examiner

PROVIDING A CELLULAR NETWORK WITH CONNECTIVITY TO A DIFFERENT NETWORK

TECHNICAL FIELD

This patent application relates to an access point in a cellular network for providing a cellular device with network connectivity to a different network.

BACKGROUND

When connecting to a radio network, an access terminal selects an access point from available radio network access points that are within communication range. Network protocols are used in communicating between an access point and the access terminal.

The 1×RTT protocol has been standardized by the Telecommunication Industry Association (TIA) in the TIA-2000.1 through TIA-2000.6 series of specifications, which are incorporated herein by reference.

The 1×EV-DO protocol has been standardized by the TIA as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-8560B, 3GPP2 C.S0024-B, version 1.0, April 2006, and is also incorporated herein by reference. Other wireless communication protocols, such as UMTS (Universal Mobile Telecommunications Service), may also be used.

SUMMARY

This patent application describes a system for use in wireless communication. The system includes a first device communicating via a first protocol in a first network, a cellular device communicating via a second protocol in a cellular network, the second protocol being incompatible with the first protocol, and an access point in the cellular network, the access point being accessible by the cellular device and being configured to enable communication between the first device and the cellular device.

The system may include one or more of the following features. The first protocol can include a digital living network alliance (DLNA) protocol. The first protocol can include a proprietary protocol. The access point can be configured to provide a cellular-air interface through which the cellular device communicates with the first device. The access point can include a femtocell. The first network and the cellular network an be in a same femtozone. The first network and the cellular network can be in different femtozones. The first device and the cellular device can communicate via a tunnel through one or more other networks.

This patent application also describes a method, used in connection with a first network including a first device that uses a first communication protocol, and a cellular network including a cellular device that uses a second communication protocol incompatible with the first communication protocol. The method includes enabling the cellular device to communicate with the first device by converting messages to the cellular device to the second communication protocol, and by converting the messages to the first device to the first communication protocol.

The method may include one or more of the following features. The enabling can include notifying the first network of presence of the cellular device. The cellular network can further include an access point and the notifying can include generating a message compatible with the first protocol by the access point and delivering the message to the first network. The first protocol can include a DLNA protocol and the message can include a DLNA-compatible message. The first protocol can include a proprietary protocol and generating can include generating a DLNA-compatible message and converting the DLNA-compatible message to a message compatible with the proprietary protocol. The method can further include limiting an amount of communication traffic between devices within the first network from entering the cellular network. The method can further include limiting an amount of communication traffic between devices within the cellular network from entering the first network. The method can further include applying a policy associated with network security to the communication between the cellular device and the first device. The method can further include transcoding a data packet delivered between the cellular device and the first device. The first device and the cellular device can communicate through a cellular-air interface. The first device and the cellular device can communicate through a macro network. The second access point can include a femtocell.

This patent application also describes a system for use in wireless communication. The system includes a first device in a first network, a cellular device in a cellular network, the cellular device comprising applications, an access point in the cellular network, the access point being accessible by the cellular device, and a cellular network connectivity function (CNCF) residing at least partially on the access point and being configured to represent the applications of the cellular device to communicate with the first device when the cellular device and the first device communicate.

The system may include one or more of the following features. The CNCF can include a CNCF server residing on the access point and a CNCF client residing on the cellular device. The CNCF server can communicate with the CNCF client using a protocol having a higher priority level than that of a protocol the cellular device uses to communicate within the cellular network. The cellular device can use a cellular network protocol incompatible with a protocol that the first device uses in the first network. The cellular device can use a protocol compatible with a protocol that the first device uses in the first network.

This application also describes a method, used in connection with a first network including a first device, and a cellular network including a cellular device and an access point accessible by the cellular device. The method includes representing applications of the cellular device using a CNCF to communicate with the access point, and enabling the cellular device to communicate with the first device through the access point based on the representation of the CNCF. The first device can communicate with a protocol incompatible with a protocol that the cellular device uses for communication.

The details of one or more examples are set forth in the accompanying drawings and the description below. Further features, aspects, and advantages will be apparent from the description, drawings, and the claims.

DETAILED DESCRIPTION

Figure 1:
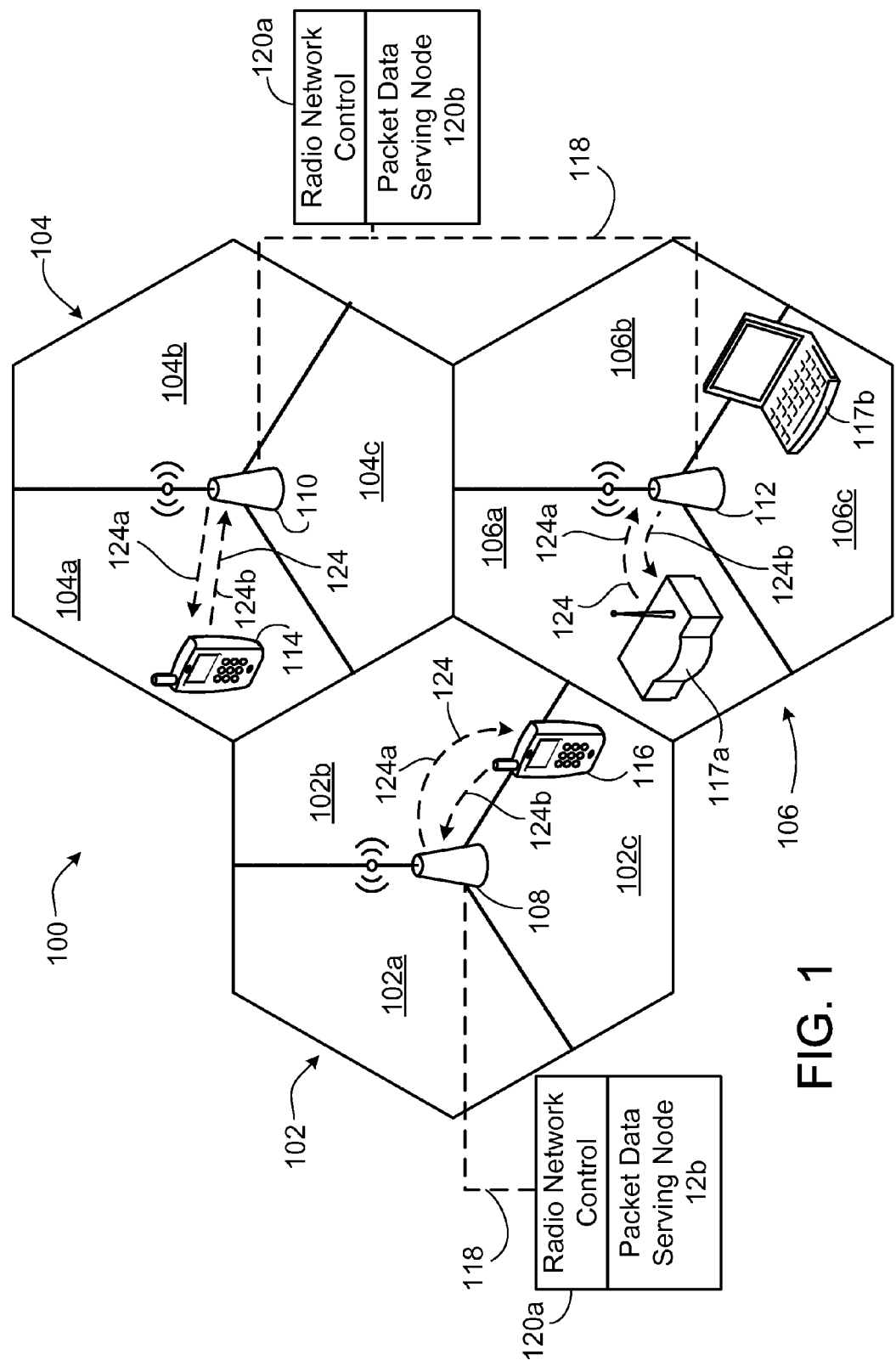
FIG. 1 is a block diagram of a network.

Referring to FIG. 1, cellular wireless communications systems, such as radio access network (RAN) 100, are designed to serve access terminals distributed in a geographic area by dividing the area into cells. At or near the center of each cell 102, 104, 106, a radio network access point, also referred to as a macro base transceiver station (BTS) 108, 110, 112, is located to serve access terminals 114, 116 (e.g., cellular telephones, laptops, PDAs). Each cell 102 may be further divided into sectors 102a-c, 104a-c, 106a-c by using sectorized antennas. A BTS 108 corresponding to a cell 102 serves one or more sectors 102a to 102c and communicates with multiple access terminals 114 within the cell 102.

RAN 100 uses the 1×EV-DO protocol to transmit data packets between an access terminal, e.g., access terminal 114 and 116, and a macro BTS, e.g., BTSs 108, 110, 112. The BTSs 108 may be connected over a backhaul connection 118 to radio network controller/packet data serving nodes (RNC/PDSN) 120a-b, which may include one or more physical devices at different locations. Although this description uses terminology from EV-DO standards, the same concepts are applicable to other communication standards, including 1×RTT, GSM, UMTS, HSDPA, WiMax, WiBro or WiFi.

The access terminals, such as access terminal 114, may be single-user devices, such as a cellular telephones and PDAs, or multiple-user devices, such as routers 117a that allow single-user devices, such as laptops 117b, to connect to the access terminals through local links (not shown). In some examples, the local links can be wired connections, e.g., Ethernet on a wired LAN, or wireless, e.g., Wi-Fi connections to a wireless local area network (LAN).

Functions of the BTS and the radio network controller (RNC) may be combined into a single device; functions of the PDSN and the radio network control (RNC) may be combined into a single device; and functions of the BTS, the RNC and the PDSN may be combined into the same device.

The implementations described herein are independent of the above combinations and the benefits apply to all combinations. References in this description to a radio access network (RAN) 100 taking action or being acted upon generally refer to a radio network control (RNC) 120a or a radio network control (RNC) 120a in combination with other devices.

Access terminals, such as access terminal 114, may be in communication with a BTS, such as BTS 108, through an air link 124. The air link 124 may include a forward link 124a (also referred to as a downlink), which carries data from a BTS 108 to an access terminal 114, and a reverse link 124b (also referred to as an uplink), which carries data from the access terminal 114 to the BTS 108.

Figure 2:
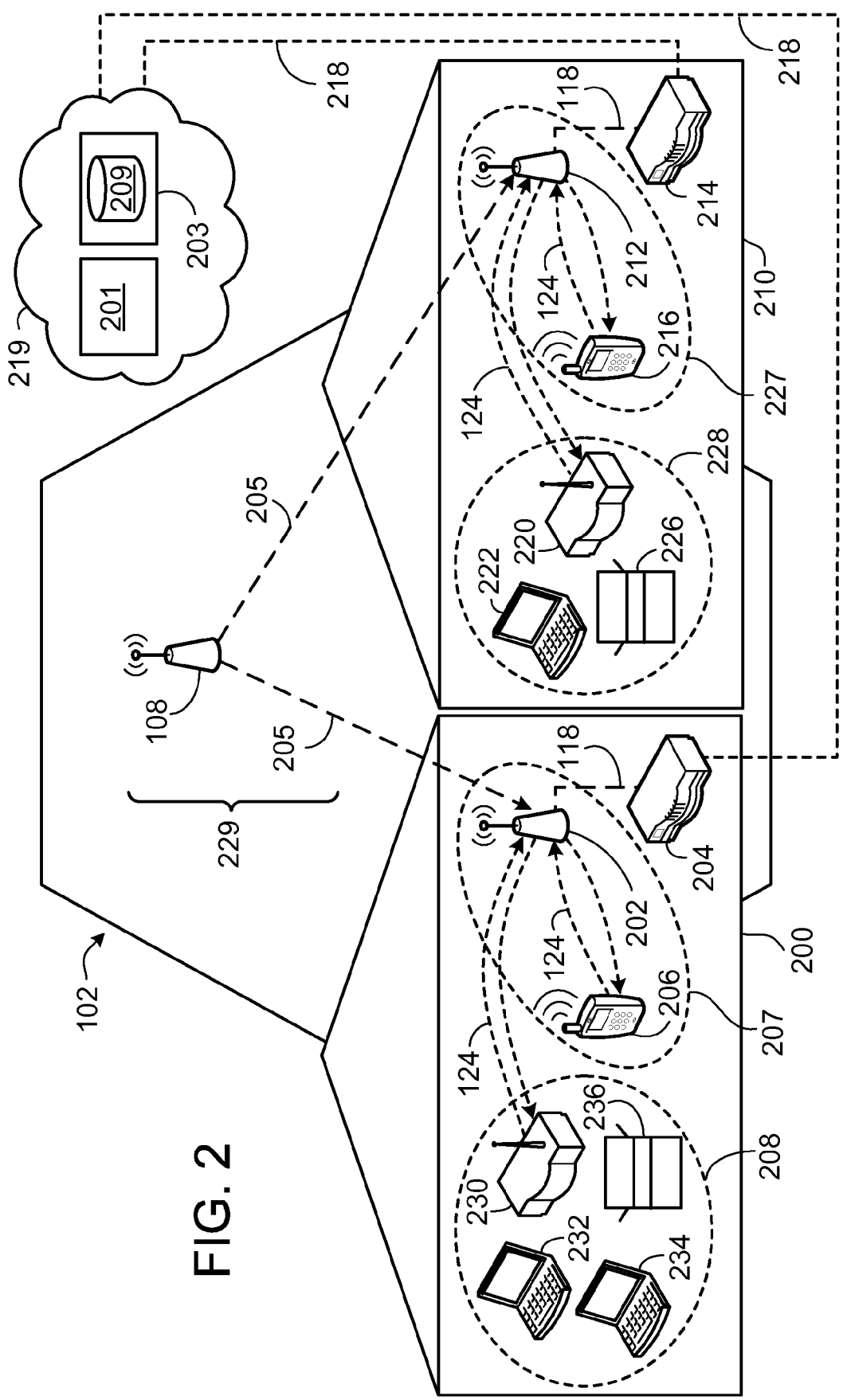
FIG. 2 is a block diagram of an access point deployment.

Referring to FIG. 2, an access point, e.g., access point 202 or 212 (which may be a femtocell or another type of private access point) may be deployed in a user's home, such as home 200, 210, in a manner similar to a WiFi® access point. The access point 202, 212 may be configured in a manner similar to a BTS. For example, the access point 202, 212 may include both a transmitter and a receiver configured to receive signals at different sub-bands. An access point can also be installed in an office, a public space, or a restaurant. The references in this description to an access point being in a "home" also include such locations.

A private access point, such as access point 202, may use an available high-speed Internet connection, such as a connection over a digital subscriber line (DSL) modem or a cable modem 204, for connection to the backhaul 218. Such an access point may be in communication with a network 219, such as a remote network or the Internet. Generally, private access points communicate with network 219 through a backhaul connection 218, such as a DSL or a cable connection. Network 219 may include one or more remote network servers, such as servers 201 and 203. A network server database, such as database 209, may be included within at least one of the network servers, such as server 203. Database 209 may be included within the same server 201 as a time server or network server database 209 may include the time server.

In the home 200, the access point 202 is used both by at least one single-user cellular device 206 and at least one multi-user home network access point 230. The access point 202 provides authorized single-user cellular device 206 with connections to a cellular network 207 to establish data connections; and the multi-user home network access point 230 provides devices (or access terminals) such as computers 232, 234, and a printer 236 with connections to a home network 208 to establish data connections. The home network access point 230 can be a WiFi access point or a router, e.g., the router 117a of FIG. 1, and the connection between the access point 230 and its access terminals can be Ethernet or Bluetooth. In some embodiments, the access point 202 may be integrated into, or connected to, the DSL or cable modem 204 or the home network access point 230. For example, the access point 202 is integrated into the DSL or cable modem 204 and the access point 230 being a WiFi access point is connected to the cable modem 204. Some details and examples of access points are discussed in co-pending application Ser. No. 11/640,501, titled Provisioning Private Access Points for Wireless Networking, and Ser. No. 11/640,503, titled Configuring Preferred User Zone Lists for Private Access Points for Wireless Networking, both filed Dec. 15, 2006, both incorporated by reference as if set forth herein in full.

The home network 208 can use the DLNA (digital living network alliance) protocol to transmit data packets, e.g., messages or commands, among the access terminals, e.g., the computers 232, 234, the printer 236, and the access point 230. The DLNA protocol includes one or more protocols and technologies, for example, the Universal Plug and Play (UPnP) protocol. The DLNA protocol can be used for data transmission among devices in the home network 208 by, for example, providing functions such as discovering, controlling the devices in the home network 208, presenting data from one device to another, and providing events to the devices. For example, the access point 230 and its access terminals are configured so that when an access terminal, e.g., the computer 232, requests to gain access to the home network 208 by, e.g., turning the computer 232 on, the access terminal delivers a message compatible with the DLNA protocol to the access point 230 to notify the access point 230 of presence of the computer 232. The devices that have accessed the home network 208, such as the computers 232, 234, the printer 236, and the access point 230 are capable of communicating with each other within the home network 208, and with connected external networks, such as the Internet 219. Other proprietary protocols, for example, Tivo or Bonjour, can also be used in the home network 208. Discussion of the function of the communication protocol within a home network 208 is also provided at http://www.dlna.org and http://www.upnp.org, the contents of both are incorporated by reference.

Generally, the home network 208 and the cellular device 206 within the cellular network 207 do not communicate with each other directly. The cellular network protocol, e.g., 1×EV-Do, UMTS, 1×RTT, that the cellular network 207 uses is not compatible with the DLNA protocol or with the proprietary protocols that the home network 208 uses.

Figure 3:
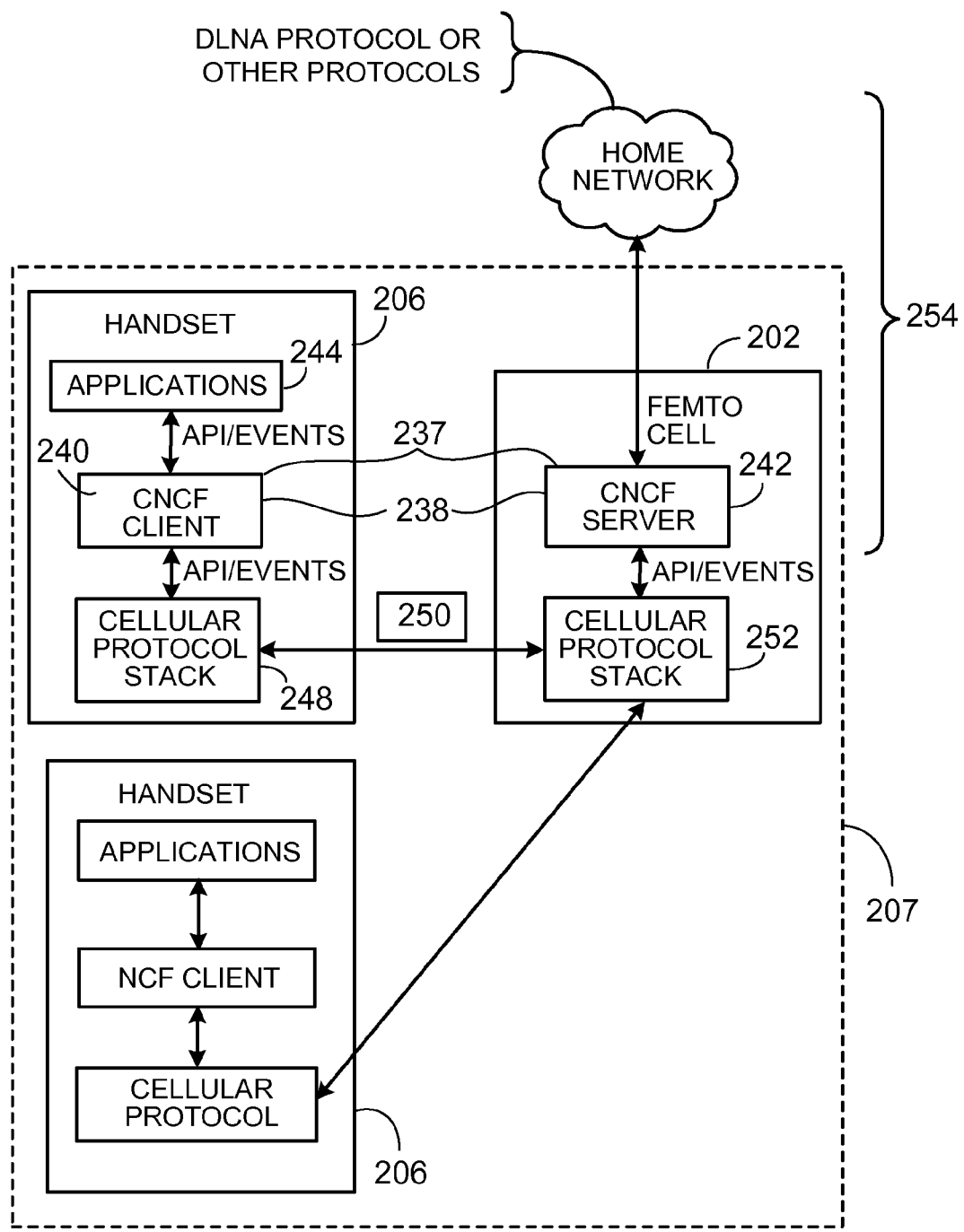
FIG. 3 is a block diagram of network connections between a cellular network and a home network.

Referring to FIG. 3, the cellular network 207 includes a cellular network connectivity function (CNCF) 237 that enables the cellular devices 206 to communicate with the home network 208 through the access point 202. The access point 202 can be a femtocell, and the cellular network 207 and the home network 208 are both within the femtozone of the femtocell. Data packets to be delivered within the cellular network 207 or between the cellular network 207 and the home network 208 are routed by the access point 202 to their intended destinations. For example, the access point 202, e.g., a femtocell, is capable of performing Local Breakout to route the data packets, based on an IP address of each data packet, to networks having different IP addresses. The Local Breakout, as used herein, is defined to be the ability of a femtocell to route communication traffic based on IP addresses to various networks, for example, the Cellular Core network, the Internet Service Provider(ISP) network, and the home network 208 that are connected to the femtocell. Discussions of Local Breakout is also provided in Femto Forum at http://www.femtoforum.org, the contents of which are incorporated by reference.

The CNCF 237 includes a first functional block CNCF client 240 operating on each cellular device 206 and a second functional block CNCF server 242 operating on the access point 202. The CNCF client 240 and the CNCF server 242 communicate with each other using a protocol 238 having a high priority level than that of the cellular network protocol. Accordingly, the CNCF client 240 is enabled to represent the applications of each cellular device 206 to exchange messages between the cellular device 206 and the CNCF server 242, and to provide events received from the CNCF to the applications. In particular, the CNCF client 240 implements a client stack functionality by building an interface between the CNCF server 242 and the cellular stacks so that applications 244 is enabled to communicate with the CNCF server 242. In addition, the CNCF client 240 also provides asynchronous events to the applications 244 when it receives the events from the CNCF server 242. The protocol 238 facilitates achieving various, e.g., all, functionalities of the CNCF client 240 and the CNCF server 242 to enable communication between the home network 208 and the cellular network 207. For example, the protocol 238 provides a way for the CNCF client 240 to send commands and responses to the CNCF server 242, or for the CNCF server 242 to send the asynchronous events to CNCF client 240.

The communications between the CNCF client 240 and CNCF server 242, and between the cellular devices 206 to the home network 208 can be enabled by software programs implemented on the access point 202 and the cellular devices 206. The software programs can be installed into devices and access points by manufacturers prior to commercial sales or can be obtained separately and installed by users. The CNCF can be configured so that a user can activate or deactivate its functionality when desired.

The CNCF provides a bridge for communication between the cellular devices 206 and the home network 208. The bridging process can include notifying each device within the two networks of the presence of any other devices, constructing an extended network 254, and delivering data packets between the devices in the cellular network 207 and those in the home network 208 once the extended network 254 is constructed. The extended network 254 can be constructed automatically when the cellular devices 206 and the network 208 are on, or manually upon the request of a user. The CNCF server 242 gathers presence information from devices in the cellular network 207 and the home network 208, and provides the gathered information to each present device in both networks, based on the subscription level of each device to its corresponding network. In particular, when the bridging is requested (automatically or manually), the applications 244 of each cellular device 206 communicate with the CNCF client 240 through the application programming interface (API) 246. The CNCF client 240, representing the applications 244 delivers a message 250 to the access point using a protocol compatible with the cellular network protocol within the cellular protocol stacks 248, 252 on the cellular device 206 and the access point 202. Upon being notified of the presence of the cellular device 206, the CNCF server 242 of the access point 202 generates a DLNA-compatible message associated with the presence and delivers the message to the access point 230 (FIG. 2) of the home network 208. The access point 230, being aware of the presence of the cellular device 206, allows the cellular device 206 to further communicate with other access terminals, such as the computers 232, 234, and the printer 236 (FIG. 2). The presence of each (e.g., all) access terminals connected to the access point 202 or the access point 230 can be identified to each device connected to the access point 230 or the access point 202 in a similar way.

Effectively, the CNCF enables the access point 230 to treat the cellular network 207 as one access terminal within the home network 208. Such an extension allows the devices that are compatible with the DLNA or other protocols, e.g., the computers 232, 234 of FIG. 2, to communicate seamlessly with devices that are incompatible with the DLNA protocol, e.g., the cellular devices 206 through a cellular-air interface. For example, when the user wants to print a picture stored in the cellular device 206 from the printer 236, the cellular device 206 sends the picture to the printer 236 for printing through the CNCF bridge, without the need for downloading the picture onto a device within the home network 208 using, for example, USB cables, and subsequently requesting the printer 236 to print out the picture from the computers 232, 234. In another example, the user can send a piece of media, e.g., music or video, stored on the computers 232, 234 to the cellular devices 206 through the CNCF bridge, without requiring USB cables to connect the computers and the cellular device.

The bridging process the CNCF performs can also be accompanied by a transcoding process to adapt a media format used in the devices within the home network 208 to one that is used in the devices within the cellular network 207, and vice versa. In the example discussed above, the piece of media delivered from the computer 232 can be in a format that is unrecognizable by the cellular device 206, e.g., in a format that facilitates efficient delivery. The CNCF, when bridging the delivery, can transcode the media piece to a format that is supported by the cellular device. In some implementations, the CNCF also transcodes data packets that are delivered between two different cellular devices within the cellular network 207. Different cellular devices can support different media formats and the CNCF adapts a media format of a packet to a specific format of a destination cellular device.

The CNCF can also function as a gateway between the cellular network 207 and the home network 208 to control traffic between the two networks. The CNCF together with the access point 202 keeps the cellular network 207 and the home network 208 relatively independent from each other when the devices within each network are communicating internally. For example, when a data packet is delivered from a device within a first network, access point 202 identifies the destination of a received data packet and blocks the broadcasting of the delivery within a second, different network when the destination is not a device in the second network. When a device in the cellular network 207 delivers a message to another device in the same network, the access point 202 reads and blocks the message from being broadcast to all devices within the home network 208 and effectively routes the message only within the cellular network 207. The CNCF can also limit communication between devices in different networks based on the intention of the device for the communication. For example, the CNCF implements policies on behalf of the cellular devices 206 to process only certain events from the home network 208 so that, for example, only a desired portion of the entire events in the home network 208 are sent to the cellular devices 206. In particular, when the cellular device 206 is only interested in communing with the printer 236 of the home network 208, even though the home network 208 can have other devices, for example, a fax machine (not shown), that advertise their services. In this case, the CNCF will only send printer-related events/presence information to the cellular devices 206. The gateway function of the CNCF server reduces the communication traffic between the devices and within each network, and the amount of broadcasts each device receives. The reduction of traffic can enhance the efficiency and effectiveness of communication within the extended network 254.

In addition, the CNCF can also implement authentication and security policies during communication between the cellular network 207 and the home network 208. For example, the CNCF can control, e.g., restrict, network connections between a device within the cellular network 207 and the operator network of the home network 208, e.g., the network 219 of FIG. 2. Similarly, the CNCF can also control the network connections between the home network 208 and the operator network of the cellular network 207 (not shown). The DLNA messages delivered to the access point 230 (e.g., when a device in the cellular network 207 requests network connection to a device in the home network 208) or received by the access point 202 (e.g., when a device in the home network 208 requests network connection to a device in the cellular network 207), are encoded by the CNCF server 242 so that such a request will only be routed within the home network 208 or the cellular network 207. Accordingly, a DLNA-compatible message received by the access point 230 does not get broadcast to, for example, the internet 219 to which the home network 208 is connected and, consequently, the cellular devices 206 do not gain direct access to the internet 219. Similarly, a DLNA-compatible message received by the access point 202 does not get broadcast to, for example, a macro-cellular network to which the cellular network 207 is connected and, consequently, the computers 232, 234 and the printer 236 do not have direct access to the macro-cellular network. The limited network connectivity can provide network security, reduce the burden of communication traffic between different networks, and enhance network efficiency.

The CNCF also authenticates a device requesting network connections to another device external to the non-extended network in which the requesting device is located. The authorization can be done when devices in different networks are broadcasting their presence and constructing the extended network 254 or when a specific network connection is requested to deliver data packets. For example, when a DLNA message is received by the access point 202 indicating that the computer 232 requests to communicate with one of the cellular devices 206, the CNCF server 242 examines the DLNA message to determine whether the computer 232 can be authorized to enter the cellular network 207. In some implementations, the CNCF applies different levels of security and authentication policies based on specific circumstances of the network connectivity. Generally, all devices, including the access point 230, which are connected to the access point 202 have been authenticated when constructing the extended network 254. As a result, less strict authentication is needed when the existing devices are communicating across networks (e.g., between the home network 208 and the cellular network 207). When a new device, e.g., a copier (not shown), is authorized to access the home network 208, the CNCF applies strict authentication rules to the copier to determine whether the copier is allowed to access the cellular network 207. Similarly, when a new cellular device, e.g., a cellular phone of a visitor to the home 200, is authorized to use the cellular network 207, the CNCF strictly authenticates the cellular phone for its access to the home network 208.

The CNCF can also be configured to provide the bridging, gateway, and authentication functions described above to a cellular network located in a first femtozone and a home network located in a second, different femtozone. This is done using a communication tunnel 229. For example, referring back to FIG. 2, the CNCF discussed above can enable the cellular device 206 of the home 200 to communicate with a computer 222 in the home 210. Similar to the home 200, the home 210 includes a cellular network 227 using the access point 212 and a home network 228. The cellular network 227 includes cellular devices 216 and the home network 228 includes a computer 222, a printer 226, and an access point 220. The access point 212 can also use a digital subscriber line (DSL) modem 214 for connection to the backhaul 218 and communicate with the network 219. The CNCF operating on the cellular devices 206, 216, and access points 202, 214 performs similar functions. The communication tunnel 229 can include the internet 219 and/or one or macro BTS 108. In use, the access point 202 delivers a DLNA message, which is associated with the request of the cellular device 206 to deliver a data packet to the computer 222, via the internet 219, to the access point 212. The DLNA message is then delivered to the access point 220, through which the cellular device 206 connects to the computer 222. The macro BTS 108 can also receive the DLNA message from the access point 202 and send the message to the access point 230 to enable the communication between the cellular device 206 and the computer 222. Other communication tunnels can be used.

The CNCF can also be configured to provide network connections between a cellular network and a home network that uses a proprietary protocol other than the DLNA protocol. Such networks may be in the same femtozone or in different femtozones. In the example shown in FIG. 3, after the CNCF server 242 generates a DLNA message and communicates with the access point 202, the gateway function of the CNCF server 242 detects that the home network 208 is using a protocol other than DNLA and converts the DLNA message to a message compatible with the particular proprietary protocol that the home network 208 is using. Similarly, the gateway function of the CNCF server 242 can translate a proprietary-compatible message received from the home network 208 into a DLNA-compatible message. The bridging function of the CNCF server 242 further facilitates communications to the cellular devices 206 in the manner explained above.

In some implementations, other cellular devices (not shown) that are capable of communicating directly with the home network 208 (e.g., when the cellular devices include protocols compatible with those of the home network 208) to communicate, locally or remotely, with the home network 208 indirectly through the CNCF. The communication protocol 238 between the CNCF client 240 and the CNCF server 242 can have a higher priority level than that of the direct communication protocol between the cellular devices and the home network 208. The CNCF client represents the communication applications of such cellular devices similarly to the representation of those applications 244 of the cellular devices 206; and the CNCF performs similar functions to those described above as to the communication. The indirection communication can allow the use of the access point 202, e.g., a femtocell, to be compatible with different devices for communication between different networks. Such indirect communication can also provide security protection to the home network 208 by preventing unauthorized, direct communication between the cellular devices and the home network 208. For example, the cellular devices can be authenticated by the access point 202 prior to accessing the home network 208.

Figure 4A:
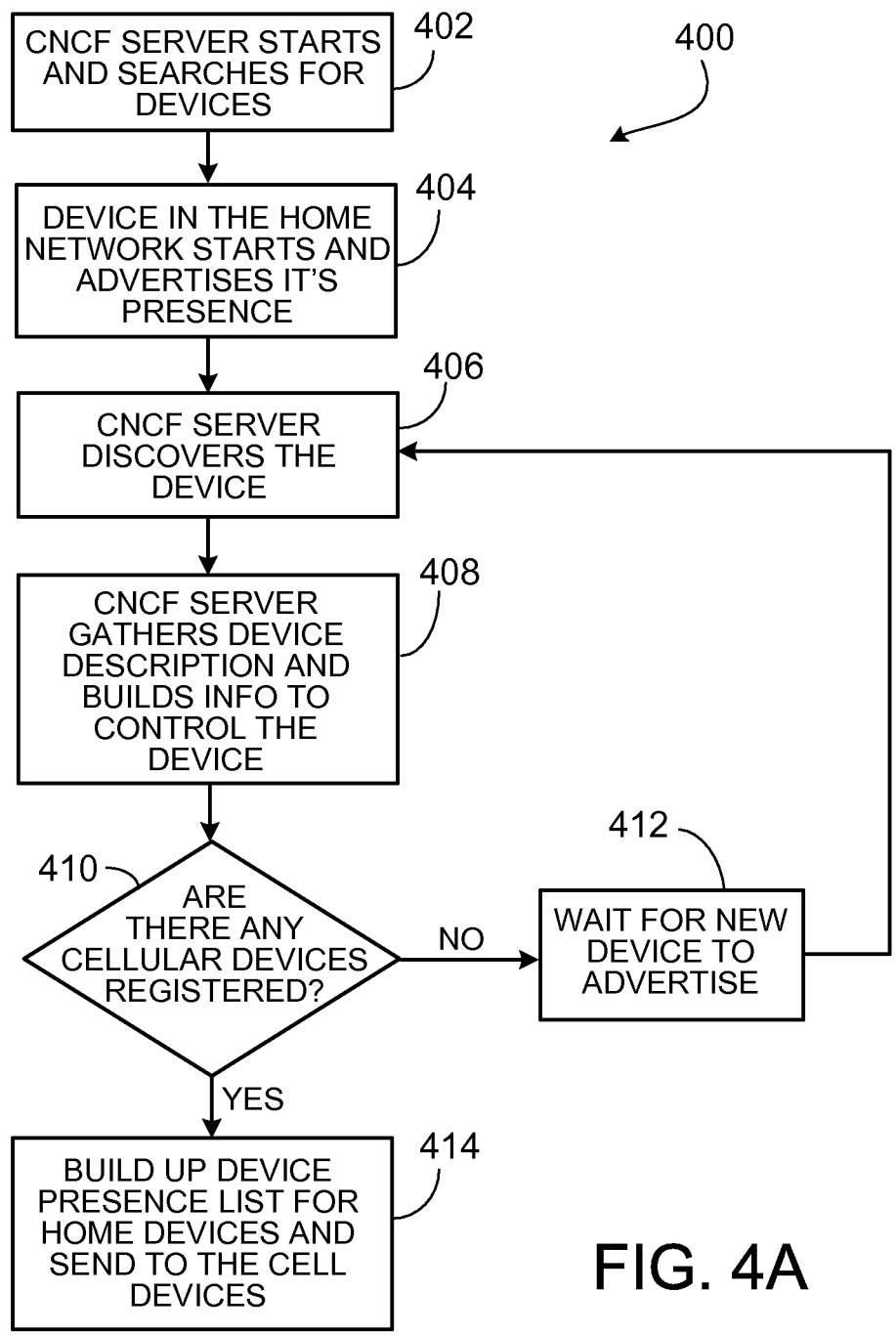
FIGS. 4A-4D are flow charts showing processes by which a cellular device communicates with a device in a home network.
Figure 4B:
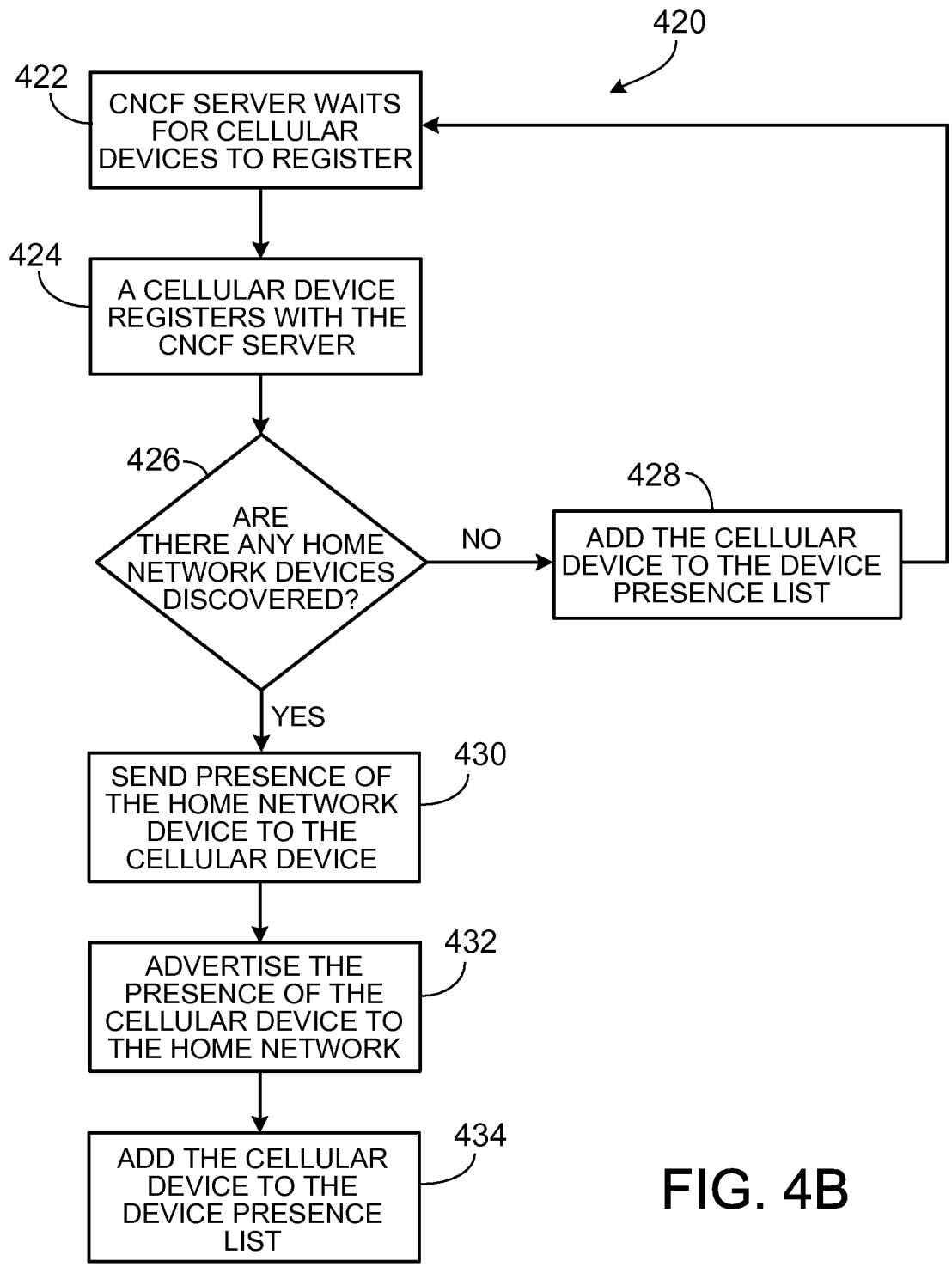

FIGS. 4A and 4B show processes 400 and 420, by which an extended network is built between a home network and a cellular network so that each device within the extended network is being notified of presence of the other devices. In particular, FIG. 4A shows a process 400 by which devices in a home network discover and join a cellular network. According to the process 400, when a CNCF sever starts, it searches (402) for devices that are already running in the home network. If a new device starts in the home network after the CNCF server starts, the new device advertises (404) its presence to the CNCF server. The CNCF sever discovers (406) both the existing and the new devices in the home network. The CNCF server then gathers (408) device descriptions of the discovered devices and builds (408) information to control each discovered device. The CNCF server then determines (410) whether there are cellular devices registered to it. If no, the CNCF server waits (412) for new devices to advertise and to discover (406) the new devices. If yes, the CNCF server builds (414) a device presence list of the devices in the home network and sends (414) the list to each registered cellular device.

Following the process 400 of FIG. 4A, by a process 420 shown in FIG. 4B, a cellular device in a cellular network discovers a home network when it starts. According to the process 420, the CNCF server waits (422) for cellular devices to register. When a cellular device boots up, it registers (424) with the CNCF server. The CNCF server then determines whether there are any devices in the home network discovered, for example, by the process 400 of FIG. 4A. If no, the CNCF server adds (428) the cellular device to the device presence list, e.g., of FIG. 4A, and goes back to wait (422) for other cellular devices to register. If yes, the CNCF server sends (430) presence of the home network device to the registered cellular device. The CNCF server also advertises (432) the presence of the registered cellular device to the home network and add (434) the cellular device to the device presence list.

The extended network can be built by other processes or by executing the process 420 of FIG. 4B prior to executing the process 400 of FIG. 4A. Further, FIGS. 4C and 4D show a process 440 by which a cellular device delivers a data packet to a device in a home network and a process 480 by which a data packet sent between the devices supporting incompatible formats is transcoded.

Figure 4C:
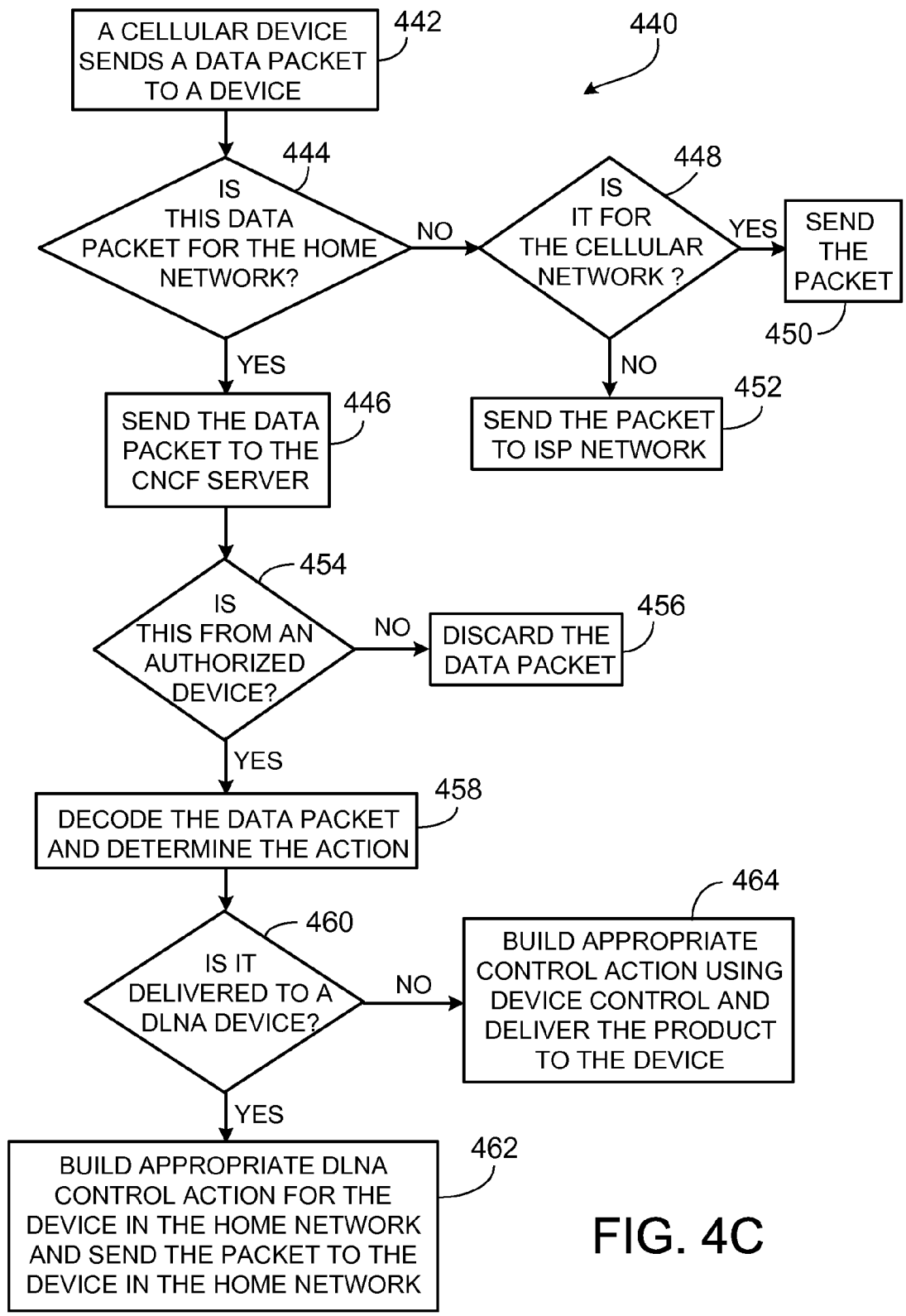

According to the process 440 of FIG. 4C, a cellular device sends (442) a data packet to a device. The access point of the cellular network determines (444) whether this data packet is intended for the home network. If no, the access point further determines (448) whether the data packet is intended for the cellular network in which the cellular device locates. If yes, the data packet is sent (450) to its destination within the cellular network. If no, the data packet is delivered (452) to an internet service provider (ISP) for its intended remote destination, such as a device in a network in a different femtozone, as described above. If the data packet is intended for the home network, the data packet is sent (446) to the CNCF server. The CNCF server determines (454) whether the data packet is delivered from an authorized device. If not, the data packet is discarded (456). If yes, the CNCF server decodes (458) the data packet to determine action to be taken. Based on the decoded packet, the CNCF server determines (460) whether the packet is to be delivered to a DLNA device. If yes, the CNCF server builds (462) an appropriate DLNA control action for the destination device in the home network and sends (462) the packet to the destination device. If no, the CNCF server builds (464) an appropriate control action using device control and delivers (464) the packet to the destination device.

Figure 4D:
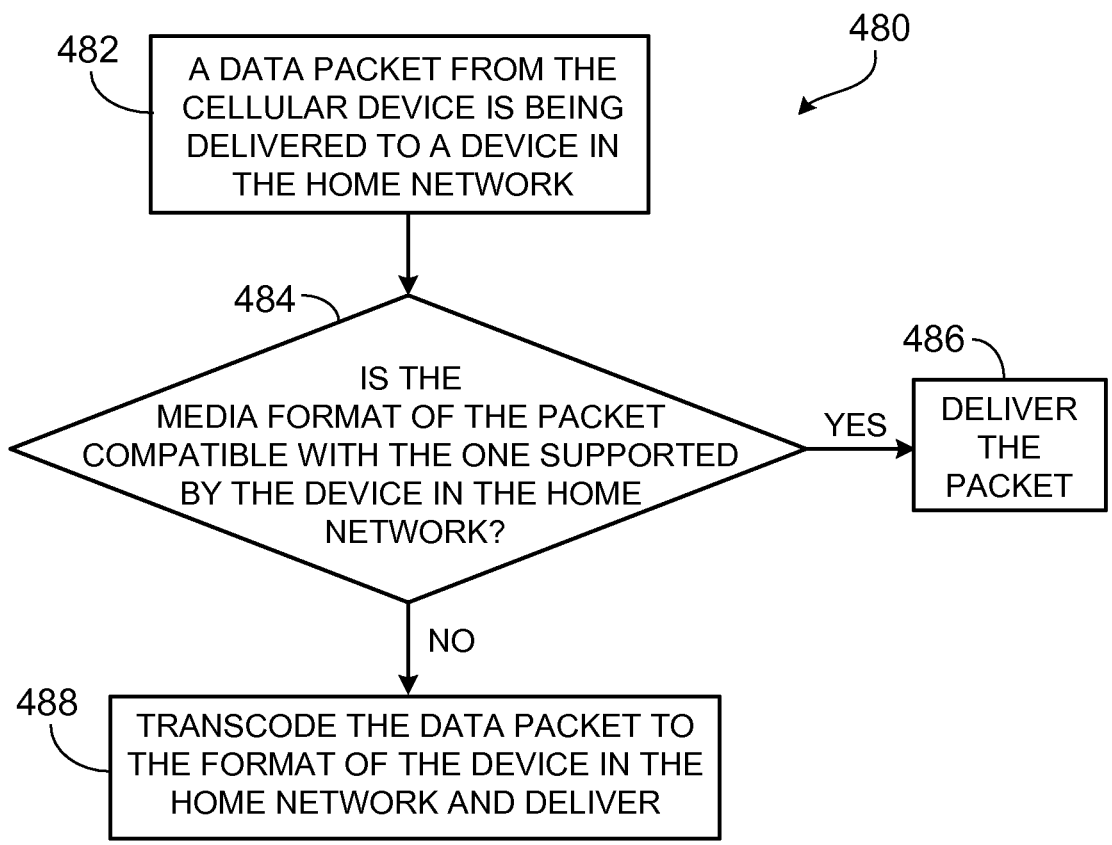

According to the process 480 of FIG. 4D, a data packet from the cellular device is being delivered (482) to a device in a home network, for example, using the process 440 of FIG. 4C. The CNCF server determines whether the media format of the packet is compatible with that of the device of the home network. If yes, the packet is delivered (486) to the destination device. If no, the CNCF server transcodes (488) the data packet to the format that is supported by the destination device in the home network and delivers (488) the transcoded data packet.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device such as a computer-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the techniques described herein can be performed by one or more programmable processors executing a computer program to perform functions described herein by operating on input data and generating output. Actions associated with the techniques can also be performed by, and apparatus for implementing the techniques can include, e.g., special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The computing system can include clients and servers. A client and server are generally remote from each other and typically interact over a communication network. The relationship of client and server arises by virtue of computer programs running on the respective computers and having a client-server relationship to each other.

Components of different embodiments described herein may be combined to form other embodiments not specifically set forth above. Any features described herein may be combined with features found in U.S. application Ser. No. 11/958,975, the contents of which are incorporated by reference.

Other embodiments not specifically described herein are also within the scope of the following claims.

What is claimed is:

1. A wireless access point comprising:
memory storing instructions that are executable; and
one or more processing devices to execute the instructions to perform operations comprising:
transmitting communications between a mobile device and a cellular network via an intermediary network, the mobile device being configured to communicate using a cellular wireless protocol and the intermediary network supporting communication using a first network protocol; and
transmitting communications between the mobile device and a home network, the home network being different from the intermediary network and the cellular network, the home network supporting communication using a second network protocol that is different from the first network protocol and the cellular wireless protocol, and the home network being accessible for communication either directly or through the intermediary network;
wherein transmitting communications between the mobile device and the home network comprises the one or more processing devices converting communications from the mobile device to the home network from the cellular wireless protocol to the second network protocol, and the one or more processing devices converting communications from the home network to the mobile device from the second network protocol to the cellular wireless protocol; and
wherein transmitting communications between the mobile device and the home network comprises the one or more processing devices determining if a media format used by a device in the home network is compatible with a media format that is used by a device in the cellular network and, if not compatible, the one or more processing devices performing a transcoding process to adapt the media format used by the device in the home network to the media format that is used by the device in the cellular network.

2. The wireless access point of claim 1, wherein the second network protocol comprises a digital living network alliance protocol.

3. The wireless access point of claim 1, wherein the second network protocol comprises a proprietary protocol.

4. The wireless access point of claim 1, wherein transmitting communications between the mobile device and the home network comprises providing a cellular-air interface through which the mobile device communicates with the home network.

5. The wireless access point of claim 1, wherein the wireless access point is a femtocell, and the mobile device and the home network are in a same femtozone of the femtocell and communicate directly through the access point not through other networks including the intermediary network.

6. The wireless access point of claim 1, wherein the mobile device and the home network are in different zones.

7. The wireless access point of claim 6, wherein the mobile device and the cellular network communicate via a tunnel through one or more other networks, the one or more other networks including the intermediary network.

8. The access point of claim 7, wherein the mobile device and the cellular network communicate via the Internet.

9. The access point of claim 7, wherein the mobile device and the cellular network communicate via a macro base transceiver station.

10. A method performed by a wireless access point configured to transmit communications between a mobile device and a cellular network via an intermediary network, the mobile device being configured to communicate using a cellular wireless protocol and the intermediary network supporting communication using a first network protocol, the method comprising:
transmitting communications between the mobile device and a home network, the home network being different from the intermediary network and the cellular network, the home network supporting communication using a second network protocol that is different from the first network protocol and the cellular wireless protocol, and the home network being accessible for communication either directly or through the intermediary network;
wherein transmitting communications between the mobile device and the home network comprises the wireless access point converting communications from the mobile device to the home network from the cellular wireless protocol to the second network protocol, and the wireless access point converting communications from the home network to the mobile device from the second network protocol to the cellular wireless protocol; and
wherein transmitting communications between the mobile device and the home network comprises the wireless access point determining if a media format used by a device in the home network is compatible with a media format that is used by a device in the cellular network and, if not compatible, the wireless access point performing a transcoding process to adapt the media format used by the device in the home network to the media format that is used by the device in the cellular network.

11. The method of claim 10, further comprising notifying the home network of a presence of the mobile device.

12. The method of claim 11, wherein the notifying comprises generating a message compatible with the second network protocol and delivering the message to the home network.

13. The method of claim 12, wherein the second network protocol comprises a DLNA protocol and the message comprises a DLNA-compatible message.

14. The method of claim 12, wherein the second network protocol comprises a proprietary protocol and generating comprises:
  generating a DLNA-compatible message, and
  converting the DLNA-compatible message to a message compatible with the proprietary protocol.

15. The method of claim 10 further comprising limiting an amount of communication traffic from the home network to the mobile device.

16. The method of claim 10 further comprising limiting an amount of communication traffic from the mobile device to the home network.

17. The method of claim 10 further comprising applying a policy associated with network security to communications between the mobile device and the home network.

18. The method of claim 10 further comprising transcoding a data packet transmitted between the mobile device and the home network.

19. The method of claim 10, wherein the mobile device and the home network communicate through a cellular-air interface.

20. The method of claim 10, wherein the mobile device and the cellular network communicate through a macro network, the macro network comprising the intermediary network.

21. The method of claim 10, wherein the mobile device and the home network are in a same femtozone and communicate directly through the access point not through other networks including the intermediary network.

22. The method of claim 10, wherein the mobile device is in a first femtozone and the home network is in a second femtozone.

23. A system for use in wireless communication, the system comprising:
  a cellular network connectivity function (CNCF) comprising a CNCF server and a CNCF client and configured to enable communication between a home network and a mobile device in a cellular network different from the home network,
  wherein the CNCF server is on a first femtocell, the CNCF client is on the mobile device, and the first femtocell comprises an access point configured to transmit communications between the mobile device and the cellular network via an intermediary network, the mobile device being configured to communicate using a cellular wireless protocol and the intermediary network supporting communication using a first network protocol,
  wherein the home network is different from the intermediary network,
  wherein the home network supports communication using a second network protocol that is different from the first network protocol and the cellular wireless protocol,
  wherein the home network is accessible for communication either directly or through the intermediary network,
  wherein the CNCF server is configured to convert communications from the mobile device to the home network from the cellular wireless protocol to the second network protocol, and to convert communications from the home network to the mobile device from the second network protocol to the cellular wireless protocol, and
  wherein enabling communications between the mobile device and the home network comprises the CNCF server determining if a media format used by a device in the home network is compatible with a media format that is used by a device in the cellular network and, if not compatible, the CNCF server performing a transcoding process to adapt the media format used by the device in the home network to the media format that is used by the device in the cellular network.

24. The system of claim 23, wherein the CNCF server communicates with the CNCF client using a protocol having a higher priority level than the cellular wireless protocol.

25. The system of claim 23, wherein the mobile device and the home network are in a same femtozone of the first femtocell and communicate directly through the access point not through other networks including the intermediary network.

26. The system of claim 23, wherein the mobile device is in a femtozone of the first femtocell and the home cellular network is in a femtozone of a second femtocell.

27. The system of claim 26, wherein the first and second femtocells communicate via the Internet, the Internet being part of the intermediary network.

28. The system of claim 26, wherein the first and second femtocells communicate via a macro base transceiver station.

29. A method comprising:
  using a cellular network connectivity function (CNCF) server on a first femtocell and a CNCF client on a mobile device to effect communication between the mobile device and the first femtocell; wherein the first femtocell is an access point that transmits communications between the mobile device and a cellular network via an intermediary network, the mobile device being configured to communicate using a cellular wireless protocol and the intermediary network supporting communication using a first network protocol; and
  transmitting communications between the mobile device and a home network using the CNCF server and the CNCF client, wherein the home network is different from the intermediary network and the cellular network, wherein the home network supports communication using a second network protocol that is different from the first network protocol and the cellular wireless protocol, wherein the home network is accessible for communication either directly or through the intermediary network, wherein the CNCF server is configured to convert communications from the mobile device to the home network from the cellular wireless protocol to the second network protocol, and to convert communications from the home network to the mobile device from the second network protocol to the cellular wireless protocol, wherein transmitting communications between the mobile device and the home network comprises the CNCF server determining if a media format used by a device in the home network is compatible with a media format that is used by a device in the cellular network and, if not compatible, the CNCF server performing a transcoding process to adapt the media format used by the device in the home network to the media format that is used by the device in the cellular network.

30. The method of claim 26, wherein the mobile device and the home network are in a same femtozone of the first femtocell and communicate directly through the access point not through other networks including the intermediary network.

31. The method of claim 29, wherein the mobile device is in a femtozone of the first femtocell and the home cellular network is in a femtozone of a second femtocell.

32. The method of claim 31, wherein the first and second femtocells communicate via the Internet, the Internet being part of the intermediary network.

33. The system of claim 31, wherein the first and second femtocells communicate via a macro base transceiver station.

* * * * *

UNITED STATES PATENT AND TRADEMARK OFFICE
CERTIFICATE OF CORRECTION

| | | |
|---|---|---|
| PATENT NO. | : 8,953,566 B2 | Page 1 of 1 |
| APPLICATION NO. | : 12/345472 | |
| DATED | : February 10, 2015 | |
| INVENTOR(S) | : Parameshwar Hegde and Fabio M. Chiussi | |

It is certified that error appears in the above-identified patent and that said Letters Patent is hereby corrected as shown below:

In the Claims

Column 12, Line 20, In Claim 8, after "The" insert -- wireless --.

Column 12, Line 22, In Claim 9, after "The" insert -- wireless --.

Column 14, Line 54, In Claim 30, delete "claim 26,", insert -- claim 29, --, therefor.

Column 14, Line 64, In Claim 33, delete "The system", insert -- The method --, therefor.

Signed and Sealed this
Second Day of June, 2015

Michelle K. Lee
*Director of the United States Patent and Trademark Office*